June 30, 1964  D. CROCKWELL  3,139,015
CAMERA

Filed May 27, 1960  3 Sheets-Sheet 1

*INVENTOR.*
DOUGLASS CROCKWELL
BY *Kenward Ross*
ATTORNEY

June 30, 1964 D. CROCKWELL 3,139,015
CAMERA
Filed May 27, 1960 3 Sheets-Sheet 2

INVENTOR.
DOUGLASS CROCKWELL
BY Kenward Ross
ATTORNEY

June 30, 1964 D. CROCKWELL 3,139,015
CAMERA
Filed May 27, 1960 3 Sheets-Sheet 3
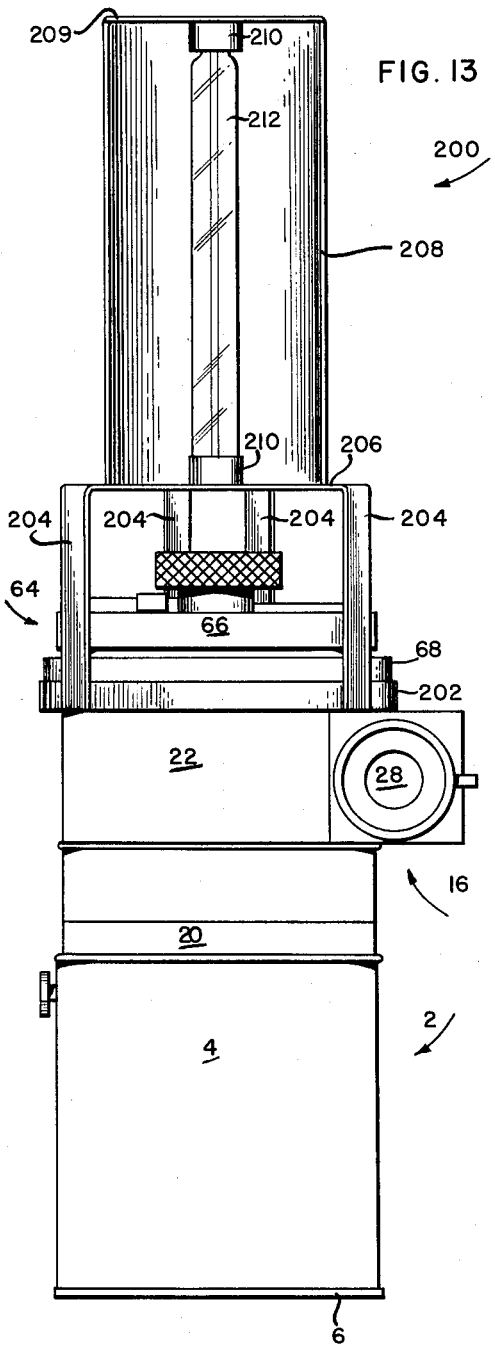
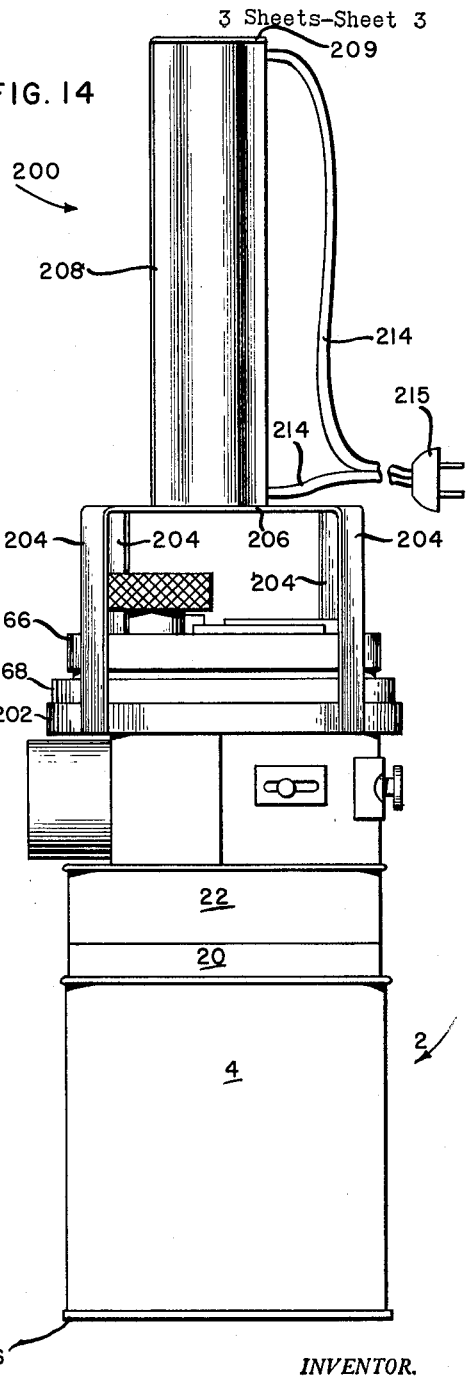
INVENTOR.
DOUGLASS CROCKWELL
BY *Kenwood Ross*
ATTORNEY

3,139,015
CAMERA
Douglass Crockwell, P.O. Box 221, Glens Falls, N.Y.
Filed May 27, 1960, Ser. No. 32,174
6 Claims. (Cl. 95—17)

The present invention relates to new and useful improvements and structural refinements in a panoramic camera. By panoramic is meant that its field of view in one direction is considerably larger than its field of view in a direction perpendicular thereto.

The invention is directed particularly to the provision of a camera which may cover, in one direction, a field up to 360° and which takes a photograph in one single exposure with a single optical system using a standard photosensitive medium.

Cognate subject matter not claimed is embraced in my companion copending application, bearing Serial Number 719,564 and filed March 6, 1958, now Patent No. 2,941,458.

The invention resides in the particular construction, arrangement, combination and relationship of the various elements, components and instrumentalities of a panoramic camera, as exemplified in the detailed disclosure hereinafter set forth, wherein the objects of the invention, as defined in the paragraphs below, will be apparent.

Structures exemplified by the known prior art all have the common objection that they are of complex construction, high cost, and delicate operation because of the necessity for complicated means for accomplishing the film-exposing operation and return motion of the rotatable cylinder.

For the taking of a picture, one dimension of which is much larger than the other, so as to offer the panoramic effect, various methods are conceivable and have found practical application. One method comprises using a number of separate cameras mounted in side-by-side relationship, each of which covers a predetermined portion of the total angular field involved. The photographs are taken simultaneously and are subsequently placed in side-by-side position to form the composite panoramic picture. Another method consists in using a film means which, during the taking of the photograph, is actuated by a driving mechanism to traverse the strip of the photosensitive medium across the camera lens. Another method consists in employing a pivoted lens arrangement. Each of such methods entails the drawback that the apparatus used is costly to produce and cumbersome to operate. In contradistinction, I have devised a novel means whereby these objections are overcome.

In prior art attempts to provide a satisfactorily operable panoramic camera, central diaphragm arrangements have ben used which offer the disagreeable features peculiar to all known types of large angle lenses, viz., the luminosity of the image diminishes in a very marked degree towards the edges and all points of the image are not situated at substantially equal distances from the axis of the film support so as to necessitate the use of a so-called image flattening lens.

For angular fields of greater than 120°, for which a central diaphragm is practically unserviceable, on account of the marked decrease in luminosity towards the edges, and for angular fields larger than 180°, for which a central system may be impossible, the diaphragm of the present invention offers a relatively simple solution to the aperture limiting problem.

It will be helpful to an understanding of my invention to first briefly consider some of the essential points and more important features and aspects thereof, so that same may be kept in mind during the subsequent reading of the detailed description of the practical embodiment of my improvements and of the illustration thereof in the hereunto annexed drawings.

Accordingly, it is first to be noted that my invention may be embodied in a panoramic camera having an optical system fitted in a rotatable housing associated with and rotative relative to a stationary housing. Light rays pass through the optical system and thence through an appropriate opening in the rotative housing. In the path of the light rays, a cylindrically shaped film support means is provided for supporting a photosensitive medium such as a strip of film, the outer surface of which is tangent to the focal surface of the optical system.

The panoramic camera hereof envisions an exposure arrangement which comprises a lens supported relative to a rotatable housing, which lens moves forwardly as the rotatable housing rotates, means for supporting the film to be exposed in a cylindrical path at a position concentric with the focus point of the lens system, a shutter means secured light-tightly with the rotatable housing for directing the light transmitted by the lens to the film, and rotative means for rotating the rotatable housing to project the light over a selected portion of the film.

It is one general object of the present invention to provide improved actuating and control mechanisms for a panoramic camera.

Another object hereof is to provide an improved shutter actuating mechanism for a panoramic camera whereby the shutter opening may be selectively and predeterminately varied.

Another feature of the invention resides in the fact that the shutter hereof may be constructed as a cylindrically curved shutter having a vertical slit, positioned coaxially relative to the film support.

In another advantageous embodiment of the camera according to the invention, a shutter is provided comprising a plurality of bands spaced from each other and disposed behind the outermost spherical shell and the entrance surface of the optical system, said bands being shiftable on axes substantially parallel to the film carrier axis between a rest position in which they shut off the light from the entrance surface of the optical system and on operating position during exposure.

Another salient feature, according hereto, lies in the fact that a panoramic camera is provided with three principal sub-assemblies or units which are removably secured together so as to constitute an improved panoramic camera of a novel unit type construction. Each of the sub-assemblies is adapted to be separately assembled and to cooperate and coact with each of the other sub-assemblies.

The complete camera envisions a stationary supporting assembly or frame delineated herein as a lower support or handgrip portion, which carries the film supporting means, a rotor assembly rotatively mounted on the stationary supporting assembly and carrying the lens system and shutter mechanism in manner to constitute an outer housing protectively enclosing the actuating mechanism contained therein, and a cap assembly.

As a further novel feature hereof, the camera is easily and readily loaded with a photosensitive medium by means of a cassette carrying the unexposed film. With such cassette in position in the camera, unexposed portions of the film may be located in proper relation to the lens means by manually operable means. It is even contemplated that a larger cassette can be employed herein which may be of such design and configuration as to carry a standard film cartridge.

The structure hereof permits the use of film with the emulsion side out. In prior art structures, the emulsion side of the film has been on the inside wherefor the lens systems likewise must be disposed on the inside.

As another novel feature, the lens carrying component is movable relative to the film to be exposed, which is held stationary, as by rotating same relative to the film at the desired speed.

As another refinement hereof, an objective lens system in provided with reverses and rereverses the image of the subject being photographed as the rotor carrying the said lens system rotates on its axis about the stationary film.

As a further novel feature of the invention, a safety shutter means is provided which is manually operable so as to close the aperture between the lens system and the film, when the lens supporting component is not rotating in its film-exposing motion.

As a still further feature, a manually adjustable means is provided for varying the area or dimension of the aperture for the lens means in order that light conditions, subject matter, and film characteristics may be taken advantage of and/or compensated for.

As another novel feature, an artificial lighting means may be combined with the camera in manner to rotate synchronously with the lens carrying component, thereby enabling use of the camera either indoors or out of doors when light conditions unfavorable to photography exist.

Being mounted upon the camera, as the lens carrying component rotates, said artificial lighting means also rotates so as to illuminate the subject to be photographed. It will be readily observable that such attachment obviates the necessity for the use of separate flood lamps and the like.

This lighting component embodies a lamp and reflector of such configuration as to cause the pattern of the beam of light projected to be relatively elongated and relatively narrow, essentially corresponding to the image area transmitted through the aperture to the film at any particular moment of the exposure rotation.

The characteristic features of the invention may be better understood when reading the following description of some of its embodiments with reference to the drawings in which:

FIG. 13 is a front elevational view of the panoramic camera apparatus of FIG. 1 having artificial lighting means incorporated therewith; and FIG. 14 is a side elevational view of the camera apparatus and lighting means shown in FIG. 13.

With continued reference now to the drawings, which illustrate a typical and preferred embodiment of the invention for the purpose of disclosure, I have shown a camera housing which will be understood to be preferentially tubular in form and inclusive of a lower support or hand grip portion, indicated generally by 2, in order that the general relation and utility of the various components may be better understood.

A covering sheath 4 of leather or the like may be disposed around said portion 2 and a lowermost cover plate 6 may be secured to its lower extremity as by screws 8 or the like.

Figure 11:
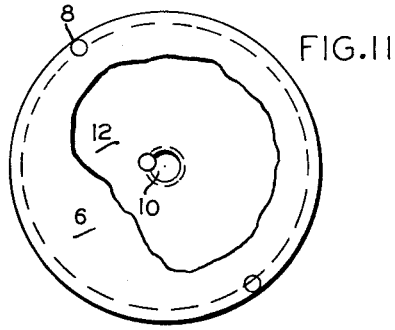
FIG. 11 is an inverted plan view of the lower plate of the camera apparatus.

An elongated vertically-extending staff 10 has its lower extremity secured in a lower wall 12 extending transversely of the lower support portion 2, as may be observed in FIG. 11.

A disc-like header 14 and an upper wall 15, extending transversely of lower support portion 2 and concentrically disposed beneath said header 14, are each secured to the upper extremity of staff 10. See FIGS. 7 and 8.

The components thus far recited form a stationary supporting assembly of the camera, it being understood that lower support portion 2 may be grasped in the hand for operational purposes.

A rotor, generally indicated by 16, is concentrically disposed above the lower support portion 2, and is provided with a lower disc or transversely extending wall 18 having an annular peripheral rim 20.

Wall 18 is disposed between the upper end of lower support portion 2 and the underside of upper wall 15 and is freely rotatable in opposite directions relative to staff 10 and the stationary supporting structure.

A vertically-extending tubular portion or cylinder 22 of rotor 16 has its lower end secured to rim 20 of wall 18 in rotor forming relation so as to be rotatable therewith. Wall 18 and cylinder 22 form said rotor 16.

A lens support 24 extends outwardly from the upper periphery of cylinder 22, and has an outer wall 26 to provide an enclosed space or area for the inner end of a lens and reversing mirror of the lens system.

A lens barrel or tube 27 of a lens 28 has its inner end secured in a forward outer wall 32 of lens support 24. Same is omitted in FIG. 7 for the sake of simplification.

Lens barrel 27 carries lens 28 and the integral structure constitutes a sub-assembly. Lens 28 has the desired optical characteristics and is provided with an iris device, of usual form, which is adjustable to obtain the opening desired, as by means of a projecting stud 36 in operative engagement with the iris adjusting device of the lens.

Since lens systems are well known in the art, it is not deemed necessary to describe and/or illustrate in detail the placement and characteristics of the lens elements.

Figure 7:
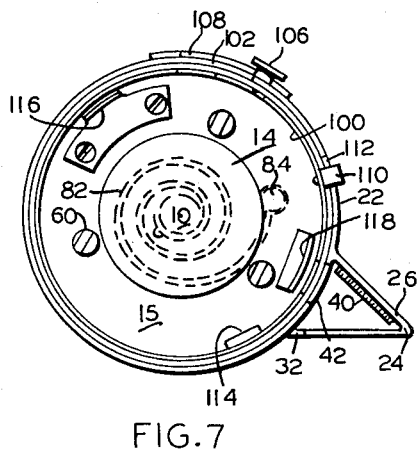
FIG. 7 is a sectional plan view on the line 7—7 of FIG. 1.

The lens system also includes a mirror 40 which is secured to the inner side of outer wall 26 of lens support 24, as best shown in FIG. 7.

The arrangement is such that light through the lens will be reflected through an opening 42, provided through cylinder 22 of the rotor, into the interior thereof, and onto a vertically disposed indexable sensitized film strip aligned with the lens. Said opening 42 may be of such dimension and shape as may be desired for the intended purpose.

It will be here explained that the camera, according to the invention, is adapted for an angular field in one direction of 360° wherefor the entire horizon can be covered in a single exposure.

Figure 1:
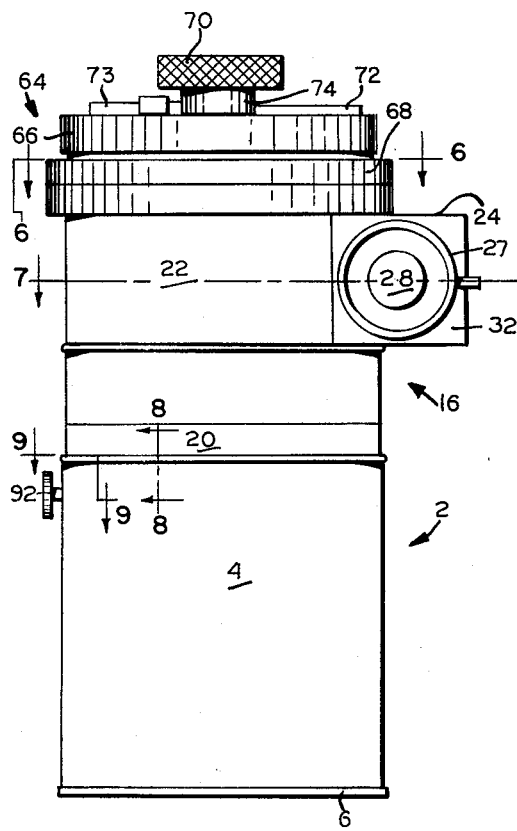
FIG. 1 is a front elevational view of panoramic camera apparatus incorporating the novel features of the invention.
Figure 2:
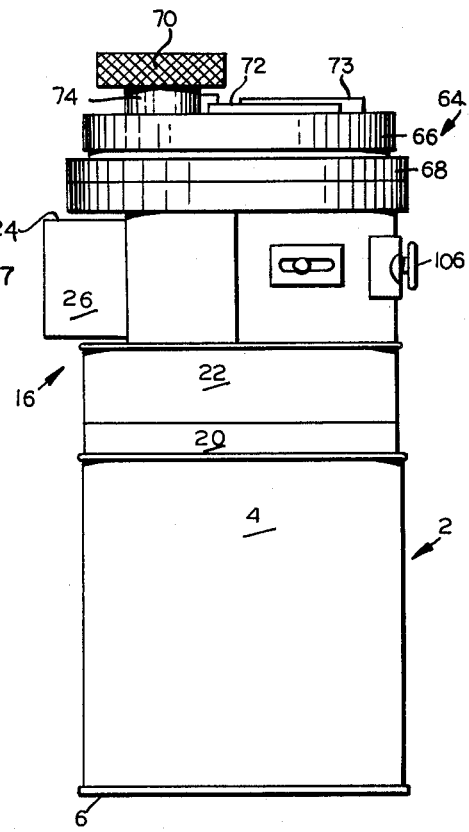
FIG. 2 is a side elevational view of the camera apparatus shown in FIG. 1.
Figure 3:
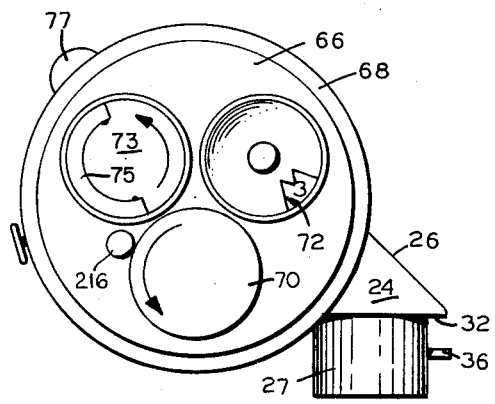
FIG. 3 is a top plan view of the camera apparatus shown in FIGS. 1 and 2.
Figure 4:
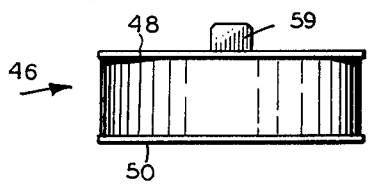
FIG. 4 is a front elevational view of the film cassette for the camera apparatus.

A cassette, generally indicated by 46, is provided. See FIG. 4. For purposes of disclosure, the cassette is formed by upper and lower parts 48 and 50 respectively secured together as by screws 52. The casette is provided interiorly with a feed cavity 54 for a roll or coil of unexposed film strip, and a takeup cavity 56 for a roll or coil of exposed film. A winding arbor 58, rotatable in cavity 56, is rotative in counter-clockwise direction for winding up the exposed film, and has an upwardly-extending operating stem portion 59 for engagement by the winding mechanism of the invention, hereinafter to appear.

Figure 5:
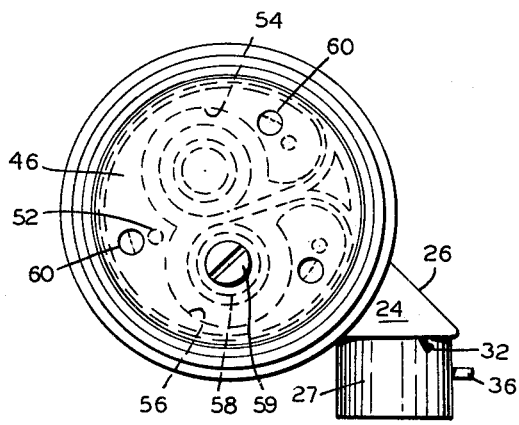
FIG. 5 is a top plan view of the upper side of the camera apparatus with the cap member removed therefrom.

The film, as it is wound up in take-up cavity 56, is drawn counterclockwise, from the supply thereof in feed cavity 54, and around the forward peripheral face of the cassette, as viewed in FIG. 5 and enters and passes from the cassette by means of slots, as shown.

The cassette is positioned on vertically extending elongated rods 60 which have lower ends secured to wall 15 and extend upwardly through said cassette.

It will be understood that the cassette can be modified so as to accept 35 mm. film cartridges of the standard designs.

A cap assembly, indicated generally by 64, is provided for releasable securement to the upper ends of said rods 60, and includes upper and lower secured together parts, indicated as 66 and 68 respectively.

Upper part 66 is provided with a manually rotatable film winding knob 70 which is operably connected by gearing to a dial having indicia delineated thereon and being observable through a window 72 provided in the upper planar side of said upper part 66.

A button 216 may also be provided for functioning to release a ratchet on the knob 70 for the rewinding of the film.

A manually rotatable film rewinding knob 73 is provided with a flip-up thumb piece 75 which may be manually engaged for the rewinding of the film into the cassette.

The film winding and rewinding and indicating mechanisms are not shown in detail and may include any well known mechanisms for winding and rewinding and indicating sections or portions of a film strip.

An operating member 74 extends downwardly from winding knob 70 for engaging the portion 59 of the winding arbor of cassette 46 when cap 64 is in position on the upper ends of rods 60.

Figure 6:
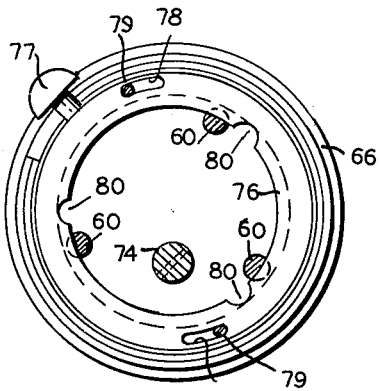
FIG. 6 is a sectional plan view on the line 6—6 of FIG. 1.

A lock ring 76 is oscillatable in upper part 66 of the cap, as in FIG. 6, and is provided with elongated slots 78 in which screws 79 are disposed. Said screws secure the upper and lower parts of cap 64 together.

The inner periphery of lock ring 76, in the position shown in FIG. 6, received in transverse cuts provided in the sides of and at the upper ends of elongated rods 60. In this position, the cap is locked to the upper ends of rods 60. As the ring is oscillated counterclockwise from the position shown, notches 80 provided in lock ring 76 register with rods 60 so that the lock ring is free of said rods and the cap may be removed upwardly from the rods so as to expose the cassette, as in FIG. 5.

A manually engageable member 77 is provided to oscillate lock ring 76 thereby to lock the cap to the rods or to release it therefrom.

Cap 64, being secured to rods 60, closes the upper side of rotor cylinder 22, and is stationary with the support.

The lower side of the cap and upper side of cylinder 22 will have interlocking parts so as to provide a light tight connection in manner that the cylinder and rotor may rotate freely relative to the stationary cap.

Said cap will also be provided on the underside thereof with means to engage the upper side of the cassette and hold it against movement.

In the drawings, rotor 16 is disposed in what will be identified as the cocked position thereof, in readiness for rotation to expose the film. The rotor is releasably held or locked in said cocked position by means to be subsequently described.

Power means is provided for rotating the rotor clockwise when released, which, for purposes of disclosure, consists of a coil spring 82 within lower support portion 2 and above wall 12 thereof. Said spring has an inner end secured in suitable manner to staff 10 and an outer end secured to a stud 84 extending downwardly from wall 18 of rotor 16.

Any desired form of spring or elastic motor may be employed. If desired, the rotor may be rotated by external means. Preferentially the rotor shall be rotated through its film exposing angle smoothly and at a desired and uniform rate of speed.

Figures 8, 9:
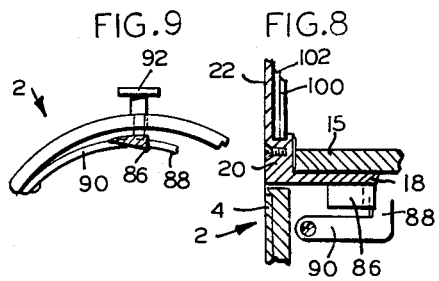
FIG. 8 is a sectional elevational view on the line 8—8 of FIG. 1.
FIG. 9 is a partial sectional view on the line 9—9 of FIG. 1.

Rotor 16 is releasably locked in its cocked position by means such as shown in FIGS. 8 and 9. A lug 86 depends downwardly from wall 18 of the rotor cylinder and is disposed behind an upstanding holding portion 88 at the outer free end of a spring 90, which is secured at its inner end to the inner side of cylinder 22. The rotor cannot rotate clockwise by action of the spring motor when releasably locked.

A push button 92 is reciprocable in the wall of the support portion 2 and is connected operably to the free end of spring 90. As button 92 is pressed inwardly, holding portion 88 is deflected inwardly and removed away from the rear end of lug 86, so that the spring motor rotates the rotor clockwise in its film exposing direction. A stop 94, associated with disc 18 of the rotor, is disposed in an arcuate slot 96 of wall 12, as in FIG. 11. By abutting the end 98 of slot 96, the clockwise film exposing rotation of the rotor is arrested. Its angle of rotation is limited to some predetermined angle.

Rotor 16 may be manually rotated counterclockwise to its cocked position. Lug 86, in such rotation, enters between the free end of spring 90 and the wall of the support portion 2 to wedge the spring free end outwardly so that the wider end of lug 86 may pass beyond the upstanding holding portion 88 of the spring. In cocked position, the spring 82 urges the rotor clockwise so that the lug is urged against the portion 88.

Rotor 16 may be electrically powered, in which instance, it may return to the cocked position by continuing the clockwise motion.

Stop 94 is shown, in FIG. 11, in the cocked position of the rotor. In cocking the rotor, allowance is made for lug 86 to rotate beyond the locking spring. Abutment of stop 94 with the opposite end 99 of slot 96 limits the rotation of the rotor in the cocking direction.

Mounted in front of the film support or cassette is a manually-operable safety shutter means which includes an inner relatively thin, resiliently biased, circular band or tape 100. An outer relatively thin, resiliently biased, circular band or tape 102 is arranged concentrically relative to and outside of band 100 and concentrically relative to and adjacent the inner side of the cylindrical wall of the rotor.

Bands 100 and 102 are independently rotatable relative to each other and to wall 22 of the rotor.

The indexable sensitized film strip is maintained and in bridging engagement with the rearward face of the inner band 100.

Figure 12:
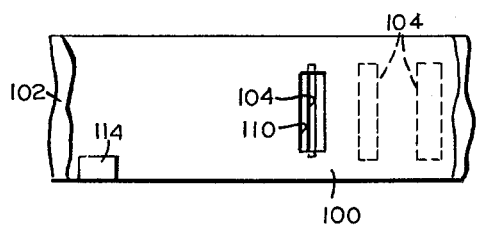
FIG. 12 is a fragmentary elevational view of the shutter and aperture means of the camera apparatus.
Figure 10:
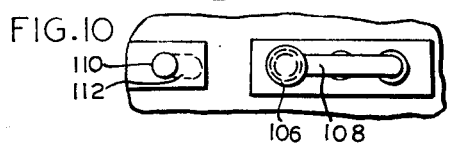
FIG. 10 is a fragmentary elevational view of the shutter operating means of the camera apparatus.

Band 102 is provided with a group of apertures in the form of slots 104, as in FIG. 12. Certain light conditions, subject matter to be photographed, and film characteristics may require a slot of a certain area. The selected aperture is positioned over the opening 42 into the lens wing by rotating the band. For this movement, a knob 106 affixed to band 102 is movable along a slot 103 in the wall of cylinder 22. See FIG. 10.

Band 100 is provide with an aperture 110 which, with said band related to band 102, as in FIG. 13, allows light from the slot 104 of said band 102 to impinge the film. Except when the film is to be exposed, band 100 may be rotated so that the apertures 104 of the band 102 are covered by the band 100. This is accomplished by rotating band 100 by a knob 110 thereof which is movable in a slot 112 of wall 22. See FIG. 11.

Band 100 automatically is rotated at the end of each exposure motion so that the slot is covered. It must be manually operated to open the slot preparatory to the exposure.

When the rotor is to be released for rotation clockwise to expose the film, the selected aperture 104 of band 102 is uncovered by band 100, so that the apertures of the two bands are in register. The aligned apertures are thus adjustable as to each other for serving to limit the entering light beams to the desired width. This width is determined by the desired luminosity of the camera lens and the degree of correction for aberrations aimed at. The width of the individual apertures are made similar that the aligned apertures will now be larger than is permissible for obtaining the desired sharpness of definition of the image.

Thanks to the small width of the slot, aberrations caused by the normal lens in normal cameras and/or the flattening lens, if one is used, are reduced to a minimum.

At the end of the exposure rotation of the rotor, a projection 114 of band 100 brings up against a stop 116 which is secured to wall 15, as in FIG. 7 so that band 100 is moved counterclockwise sufficiently to bring aperture 110 of band 100 out of register with aperture 104 of band 102 so that aperture 104 is covered by band 100. The rotor may then be rotated to its cocked position, without danger of the film being light struck.

A baffle 118 is also provided and has a lower end secured to wall 15 and extends upwardly adjacent the inner side of inner band 100 to overlie the respective apertures of the bands and to shut off light from the lens. Said baffle functions to prevent light coming through aperture 104 from striking the film when the apertures of the bands are in register therewith and when the rotor is in a cocked rest position in readiness for its film exposing rotation.

When button 92 is pressed, aperture 104, which is not covered by band 100, is rotated past the baffle so that light impinges the film during the film exposing rotation of the rotor.

The film exposing rotation of the rotor may be of any angle up to 360 degrees.

In such rotation, lens 28 traverses the film strip to produce the panoramic image on the film.

It will be noted that the rotor carrying the lens mechanism is mounted for rotation on a support so that said lens mechanism traverses the stationary film material for producing a panoramic image on a section of said film material.

As a special feature of the invention, mechanism is provided which is arranged to shut off light when the rotor is at rest and to automatically pass light during the film exposing rotation and to shut off light on completion of said rotation. The rotor is releasably locked in cocked position and, on release therefrom, it makes the film exposing rotation through a predetermined arc or angle, and may be readily returned to a cocked position where it is automatically releasably locked.

The film material may be of the negative, positive or color type, and it will be noted that the film strip, for exposure thereof, is held stationary while the rotor rotates concentrically therearound during its exposing rotation facilitating the impingement thereon of a mirror-reversed or prism reversed image.

Various type of power means may be used to provide the desired smooth speed of rotation of the rotor, and, of course, the angle of film exposing may be as desired, within the limits of the apparatus.

The exposed film may be viewed in a viewer or by means of projection or otherwise, all as may be desired.

In order that the image shall be stationary during the film exposing rotation of the rotor, the focal length of the lens mechanism, including the objective and the reversing mirror, will closely approximate the radius of arc of that portion of the film strip to be exposed.

The light rays for the image of the subject being photographed are projected by the lens toward the film which is unwound from the feed cavity, stretched taut in a circumference over the cylindrically curved forward peripheral face of the cassette serving as a film support, and spooled into the take-up cavity.

The light rays are refracted and reflected rearwardly by the optical system and made to converge at the required point on the image surface through the aligned apertures of the bands.

In FIGS. 13 and 14, I have illustrated my novel panoramic camera having an artificial lighting means generally designated by 200 superposed thereon and carried thereby.

Said artificial lighting means is comprised of an annular base or ring member 202, vertical brace members 204 disposed about the outer circumference of said ring and rising therefrom, a horizontal platform member 206 resting upon and supported by said brace members, a reflective shield 208 rising vertically from said platform, lamp receptacles 210 disposed within the contour of, and at the opposite ends of said reflective shield, and a vertical lamp 212 the distal ends of which are receivable in said receptacles. This lamp may be replaced by a row of small spherical lamps.

The annular base member 202 is of suitable diameter to make a firm contact with a top flange 68 of rotor 22. The light means 200 turns with rotor 22.

A horizontal cover member 209 is disposed at the upper extremity of the reflective shield 208 and may be affixed thereto as by welding, soldering or the like.

Upper lamp receptacle 210 depends from cover member 209, while lower lamp receptacle 210 rises from platform member 206.

As shown in FIG. 14, power lines 214 extend outwardly from the lamp receptacles 210 through the rear surface of the reflective shield 208, which power lines may be connected to any suitable electrical power supply as by a male plug 215. Alternatively, the base 4 of the camera may be modified to carry dry cells or the like whereby the camera may carry its own electrical power supply to operate the artificial lighting means.

The lamp 212 must of necessity be not only of sufficient capacity to brightly illuminate the subject to be photographed, but also must be of a size appropriate to be readily attached to and transported with the panoramic camera.

The concave forward face 216 of reflective shield 208 is curved in parabolic horizontal cross section to better concentrate in vertical pattern the light cast by lamp 212.

From the foregoing, it will be readily observed that, as the lens carrying mechanism of the camera is rotated, lighting means 200 is also in synchronous rotation therewith insuring continuous illumination of that part of the subject being photographed at any particular moment.

It will also be noted that said lighting means is extremely compact, simple in its construction and readily adaptable for easy installation for use with my novel panoramic camera.

Various changes and modifications may be made to the form of the apparatus of the invention shown without departing from the spirit and scope thereof and therefore it is desired to be limited, if at all, by the appended claims rather than the foregoing description.

I claim:

1. Camera apparatus of the class described comprising in combination, a supporting structure, a hollow rotor rotatable on said supporting structure from cocked position in film-exposing direction and reversely to cocked position in returning direction, stop means for limiting rotation of said rotor in film-exposing direction to a certain angle, lock means for releasably locking said rotor in cocked position, strip film material supporting means within said rotor for supporting strip film material relative to said rotor, power means for rotating said rotor in film-exposing direction, a lens mechanism carried by said rotor on an axis transverse to the axis of rotation of said rotor for directing light to spaced locations on the strip film material, aperture means having an aperture for said lens mechanism, baffle means covering the aperture of said aperture means in cocked position of said rotor, manually operable covering means for covering and uncovering the aperture of said aperture means and including a circular band inwardly of said aperture means and rotatable in opposite directions and having an aperture for registering with the aperture of said aperture means, and automatic means engageable as said rotor completes its film-exposing rotation to operate said covering means to aperture covering position and including engageable parts carried by said supporting structure and covering means and arranged for engagement at the end of the film-exposing rotation of said rotor for rotating the band of said baffle means to move the apertures out of register.

2. In a camera having an exposure opening for making an exposure on a photosensitive medium, the combination of, a supporting structure, a rotor rotatable on said structure from cocked position in a film-exposing direction and reversely in a returning non film-exposing direction to cocked position, stop means for limiting rotation of said rotor in film-exposing direction, a stationary cap for said rotor, lock means for releasably locking said rotor in cocked position, support means within said rotor for supporting a photosensitive medium in fixed circular position relative to said supporting structure and rotor during exposure, power means for rotating said rotor in film-exposing direction, a lens mechanism carried by said rotor and rotatable therewith on an axis transverse to the axis of rotation of said rotor for directing light for impingement upon an area of the photo sensitive medium, a sleeve member having an aperture therethrough for allowing the passage of light from said lens mechanism to the photosensitive medium, baffle means covering the aperture of said aperture means in the cocked position of said rotor, covering means for covering the aperture of said sleeve member other than during the rotation of said rotor in film-exposing direction, automatic means operable on completion of the rotation of said rotor in film-exposing direction for operating said covering means to aperture covering position relative to said sleeve member, said covering means including a circular band disposed inwardly of said sleeve member and being rotatable in opposite directions and having an aperture registrable with the aperture of said sleeve member, engageable members carried by said supporting structure and covering means and arranged for engagement at the end of the film-exposing rotation of said rotor for rotating the circular band of said covering means to move the apertures out of register.

3. In a camera as set forth in claim 2, the improvement including, releasable lock means for locking said rotor in the cocked position.

4. In a camera as set forth in claim 2, the improvement including, means for releasably holding said rotor in rest position and being manually operable to release said rotor for rotation in film-exposing direction.

5. In the camera as set forth in claim 2, the improvement including, means for varying the size of the aperture in said sleeve member for varying the amount of light admitted therethrough.

6. In the camera as set forth in claim 2, the improvement including, said sleeve member and covering means being independently rotatable relative to each other and relative to said rotor, the apertures of said sleeve member and covering means being adjustably registrable with said lens system during rotation of said rotor in the film-exposing direction and non-registrable when said rotor is in other than film-exposing motion.

References Cited in the file of this patent
UNITED STATES PATENTS

| | | |
|---|---|---|
| 439,121 | Crane | Oct. 28, 1890 |
| 621,545 | Stark | Mar. 21, 1899 |
| 2,129,959 | Pollock | Sept. 13, 1938 |
| 2,521,956 | Wallace | Sept. 12, 1950 |
| 2,764,073 | Liw | Sept. 24, 1956 |
| 2,782,699 | Vander Hooft | Feb. 26, 1957 |
| 2,844,069 | Azarraga | July 22, 1958 |
| 2,920,543 | Azzarraga | Jan. 12, 1960 |
| 2,941,458 | Crockwell | June 21, 1960 |
| 2,943,548 | Thalhammer | July 5, 1960 |